United States Patent [19]

Gibson

[11] Patent Number: 5,591,254
[45] Date of Patent: Jan. 7, 1997

[54] VAPOR RECOVERY SYSTEM WITH AUTOMATIC VALVE CONTROL

[75] Inventor: David L. Gibson, Louisville, Ky.

[73] Assignee: Jordan Holding Company, Fisherville, Ky.

[21] Appl. No.: 501,353

[22] Filed: Jul. 12, 1995

[51] Int. Cl.⁶ .................................................. B01D 53/047
[52] U.S. Cl. ................................. 96/113; 96/122; 96/128; 96/130; 96/133; 96/144
[58] Field of Search .............................. 96/113, 114, 121, 96/122, 126–128, 130, 133, 144

[56] References Cited

U.S. PATENT DOCUMENTS

| 2,919,766 | 1/1960 | Dillman et al. | 95/93 |
| 3,266,262 | 8/1966 | Moragne | 62/54 |
| 3,282,027 | 11/1966 | Johnson et al. | 96/113 X |
| 3,320,756 | 5/1967 | Hashemi | 62/45 |
| 3,714,790 | 2/1973 | Battey | 62/54 |
| 3,771,317 | 11/1973 | Nichols | 62/54 |
| 3,830,040 | 8/1974 | Hendrix | 95/193 |
| 3,830,074 | 8/1974 | Nichols | 62/54 |
| 3,867,111 | 2/1975 | Knowles | 95/21 |
| 3,972,201 | 8/1976 | Datis | 62/54 |
| 4,074,984 | 2/1978 | Führing | 96/114 |
| 4,077,789 | 3/1978 | Edwards | 62/54 |
| 4,110,996 | 9/1978 | Thompson | 62/54 |
| 4,197,095 | 4/1980 | White, Jr. et al. | 96/113 X |
| 4,276,058 | 6/1981 | Dinsmore | 95/93 |
| 4,283,212 | 8/1981 | Graham et al. | 95/115 X |
| 4,343,629 | 8/1982 | Dinsmore et al. | 95/93 |
| 4,350,018 | 9/1982 | Frank et al. | 62/54 |
| 4,351,649 | 9/1982 | Owens et al. | 96/126 X |
| 4,462,811 | 7/1984 | Dinsmore et al. | 96/113 X |
| 4,480,393 | 11/1984 | Flink et al. | 34/27 |
| 4,539,019 | 9/1985 | Koch | 96/113 X |
| 4,569,207 | 2/1986 | James | 62/235.1 |
| 4,670,028 | 6/1987 | Kennedy | 95/92 |
| 4,682,549 | 7/1987 | Hall | 110/345 |
| 4,714,483 | 12/1987 | Koening et al. | 96/144 X |
| 4,715,868 | 12/1987 | Kennedy | 95/94 |
| 4,963,168 | 10/1990 | Spencer | 96/122 |
| 5,006,138 | 4/1991 | Hewitt | 62/18 |
| 5,076,822 | 12/1991 | Hewitt | 62/18 |
| 5,176,002 | 1/1993 | O'Brien et al. | 62/48.2 |
| 5,187,131 | 2/1993 | Tiggelbeck et al. | 502/34 |
| 5,240,481 | 8/1993 | Li et al. | 96/133 X |
| 5,389,125 | 2/1995 | Thayer et al. | 96/113 X |
| 5,426,945 | 6/1995 | Menzenski | 62/11 |
| 5,480,475 | 1/1996 | Tuttle | 96/122 |

FOREIGN PATENT DOCUMENTS

| 62-005007 | 2/1987 | Japan | 96/113 |
| 5-228322 | 9/1993 | Japan | 96/113 |
| 1666165 | 7/1991 | U.S.S.R. | 96/113 |

OTHER PUBLICATIONS

Dinsmore, Harold L.; "Excessive Carbon Bed Temperatures"; Service Bulletin 11, John Zink Co.; Jul. 6, 1993.

Primary Examiner—Robert Spitzer
Attorney, Agent, or Firm—King and Schickli

[57] ABSTRACT

A vapor recovery apparatus is provided with an automatic flow control system. The apparatus includes first and second reaction vessels. Each reaction vessel holds a bed of adsorbent for adsorbing volatile liquid vapor and producing relatively volatile liquid vapor-free air. A vacuum pump is provided for regenerating the beds of adsorbent. A cooler and/or absorber tower is provided to recover volatile liquid vapor generated during bed regeneration. Conduits are provided for the passage of air-volatile liquid vapor mixture between the various components of the apparatus. A series of valves direct the flow of the air-volatile liquid vapor mixture through the conduits. The automatic flow control system includes a vacuum transmitter for monitoring air pressure within the apparatus at a selected point and a controller responsive to the sensed pressure for controlling the operation of the valves.

6 Claims, 2 Drawing Sheets

VAPOR RECOVERY SYSTEM WITH AUTOMATIC VALVE CONTROL

TECHNICAL FIELD

The present invention relates generally to the field of volatile liquid vapor recovery and, more particularly, to an apparatus furnishing improved efficiency of operation and overall productivity through the provision of an automatic valve control system.

BACKGROUND OF THE INVENTION

When handling volatile liquids such as hydrocarbons including gasoline and kerosene, air-volatile liquid vapor mixtures are readily produced. The venting of such air-vapor mixtures directly into the atmosphere results in significant pollution of the environment and a fire or explosion hazard. Accordingly, existing environmental regulations require the control of such emissions.

As a consequence, a number of processes and apparatus have been developed and utilized to recover volatile liquids from air-volatile liquid vapor mixtures. Generally, the recovered volatile liquids are liquefied and recombined with the volatile liquid from which they were vaporized thereby making the recovery process more economical. The initial vapor recovery systems utilized in the United States in the late 1920's and early 1930's incorporated a process combining compression and condensation. Such systems were originally only utilized on gasoline storage tanks. It wasn't until the 1950's that local air pollution regulations began to be adopted forcing the installation of vapor recovery systems at truck loading terminals. Shortly thereafter, the "clean air" legislation activity of the 1960's, which culminated in the Clean Air Act of 1968, further focused nationwide attention on the gasoline vapor recovery problem. As a result a lean oil/absorption system was developed. This system dominated the marketplace for a short time.

Subsequently, in the late 1960's and early 1970's cryogenic refrigeration systems began gaining market acceptance (note, for example, U.S. Pat. No. 3,266,262 to Moragne). While reliable, cryogenic systems suffer from a number of shortcomings including high horsepower requirements. Further, such systems require relatively rigorous and expensive maintenance to function properly. Mechanical refrigeration systems also have practical limits with respect to the amount of cold that may be delivered, accordingly, the efficiency and capacity of such systems is limited. In contrast, liquid nitrogen cooling systems provide more cooling than is required and are prohibitively expensive to operate for this type of application.

As a result of these shortcomings, alternative technology was sought and adsorption/absorption vapor recovery systems were more recently developed. Such a system is disclosed in a number of U.S. patents including, for example, U.S. Pat. No. 4,276,058 to Dinsmore, the disclosure of which is fully incorporated herein by reference. Such systems utilize a bed of solid adsorbent selected, for example, from silica gel, certain forms of porous mineral such as alumina and magnesia, and most preferably activated carbon or charcoal. These adsorbents have an affinity for volatile hydrocarbon liquids. Thus, as the air-hydrocarbon vapor mixture is passed through the bed, a major portion of the hydrocarbons contained in the mixture is adsorbed on the bed. The resulting residue gas stream comprising substantially hydrocarbon-free air is well within regulated allowable emission levels and is exhausted into the environment.

It should be appreciated, however, that the bed of adsorbent used in these systems is only capable of adsorbing a certain amount of hydrocarbons before reaching capacity and becoming ineffective. Accordingly, the bed must be periodically regenerated to restore the carbon to a level where it will effectively adsorb hydrocarbons again. This regeneration of the adsorbent is a two step process.

The first step requires a reduction in the total pressure by pulling a vacuum on the bed to remove the largest amount of hydrocarbons. The second step is the addition of a purge air stream that passes through the bed. The purge air polishes the bed so as to remove substantially all of the remaining adsorbed hydrocarbons. These hydrocarbons are then pumped to an absorber tower wherein lean oil or other nonvolatile liquid solvent is provided in a countercurrent flow relative to the hydrocarbon rich air-hydrocarbon vapor mixture being pumped from the bed. The liquid solvent condenses and removes the vast majority of the hydrocarbons from that mixture and the residue gas stream from the absorber tower is recycled to a second bed of adsorbent while the first bed completes regeneration.

It should be appreciated that for the vapor recovery system to operate at maximum efficiency, the adsorption and regeneration cycles must be initiated at the appropriate time. Further, the change over between cycles must be smooth and precise. More specifically, the pressure in the vapor recovery system and particularly the reaction vessels holding the beds of adsorbent may be evacuated to a pressure as low as, for example, 27 inches of mercury vacuum during regeneration. In contrast, during the adsorption cycle the beds are subjected to a pressure of atmospheric pressure or slightly greater depending on the system for delivering air-volatile liquid vapor to the beds. Thus, it should be appreciated that the beds are subjected to very significant pressure changes during each complete operating cycle.

Improper operation of the valves controlling the flow through the vapor recovery system may in some instances lead to very sudden pressure changes. Such sudden changes have a tendency to fracture/crumble the adsorbent in the beds thereby detrimentally affecting the pore structure of the adsorbent and, consequently, its adsorbtivity. Hence, the effective service life of the adsorbent may be significantly reduced inadvertently through improper operation of the valves. Similarly, sudden pressure changes in the vapor recovery system due to the too rapid opening and closing of valves separating portions of the system at significantly different pressure levels may result in heavy loads being placed upon the vacuum pump. These loads increase the stress and strain on the pump components possibly causing excessive wear and thereby significantly reducing the operational life of the pump. Unfortunately, as manual valve operation is by necessity subject to the learning curve of new operators and the ever present problem of human error, these sudden pressure change induced problems are prevalent in state of the art vapor recovery systems.

SUMMARY OF THE INVENTION

Accordingly, it is a primary object of the present invention to provide a vapor recovery system overcoming limitations and disadvantages of the prior art just described.

A more specific object of the present invention is to provide an apparatus for the recovery of volatile liquid vapor from an air-volatile liquid vapor mixture that is characterized by increased efficiency of operation and, therefore, productivity.

Still another object of the present invention is to provide a vapor recovery system incorporating an automatic valve control system that senses air pressure within the system at selected points and operates upon pressure sensor inputs to control the opening and closing of the valves of the apparatus thereby preventing sudden pressure changes that have a tendency to fracture/crumble the adsorbent and/or place undue loads upon the vacuum pump of the apparatus during bed regeneration.

Yet another object of the present invention is to provide an automatic valve or flow control system of relatively simple and inexpensive construction that may be retrofitted to existing vapor recovery systems so as to enhance the efficiency and productivity of those systems.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an apparatus is provided for recovering volatile liquid vapor from an air-volatile liquid vapor mixture. The apparatus includes means for adsorbing volatile liquid vapor and producing relatively volatile liquid vapor-free air. Preferably, the adsorbing means are first and second reaction vessels each including a bed of adsorbent having an affinity for the volatile liquid vapor to be recovered. Such adsorbents are well known in the art.

The apparatus also includes a means for regenerating the adsorbent and releasing the previously adsorbed volatile liquid vapor. Preferably, the regenerating means is a vacuum pump that is utilized to alternately evacuate the reaction vessels and, therefore, the bed of adsorbent therein. Preferably, the vacuum pump is a conventional seal vacuum pump also known as a liquid ring vacuum pump. Advantageously, liquid seal vacuum pumps are capable of producing a high vacuum while also being relatively inexpensive and generally safer to operate than other types of vacuum pumps when recovering flammable vapors.

The apparatus also includes a means for recovering volatile liquid vapor generated during bed regeneration. As is known in the art, such a recovering means may be a cooler that is cooled by a refrigeration unit and/or an absorber tower or column wherein lean oil or other non-volatile liquid solvent is provided in a countercurrent flow to condense and remove the volatile liquid vapor being recovered.

Additionally, the apparatus includes a means for circulating the air-volatile liquid vapor mixture between the adsorbing means, regenerating means and recovering means. Preferably, the circulating means includes a conduit for the passage of the air-volatile liquid vapor mixture between the various adsorbing, regenerating and recovering components and a valve means such as a series of valves for directing the flow of the air-volatile liquid vapor mixture along the conduits.

Finally, the apparatus also includes a flow control means. The flow control means or automatic valve control system includes a sensor means for monitoring air pressure at selected points in the vapor recovery apparatus and a control means responsive to the pressure sensor means for controlling the operation of the valves and, therefore, the flow of the air-volatile liquid vapor mixture through the apparatus.

More specifically describing the automatic valve control system, the sensor means is preferably a vacuum transmitter. The vacuum transmitter monitors the vacuum in the apparatus at various selected points including at each bed of adsorbent and at an inlet leading to the vacuum pump. This may be achieved by providing the vacuum transmitter in fluid communication with a monitoring line including a series of sensor valves. The sensor valves are operable to establish selective communication between the monitoring line and the vapor recovery system conduit adjacent to each of the beds of adsorbent and the inlet to the vacuum pump.

Preferably, the control means is a dedicated microprocessor or a programmable logic controller operating in accordance with appropriate software.

Additionally, the control means of the automatic valve control system includes means for tuning the valves and thereby directing the flow of air-volatile liquid vapor mixture between the adsorbing means or reaction vessels and the regenerating means or vacuum pump in response to the microprocessor or programmable logic controller.

In accordance with yet another aspect of the present invention, the vapor recovery apparatus also includes vent valves. One vent valve is connected to each reaction vessel so as to allow the interior of the reaction vessel to selectively communicate with the atmosphere. Preferably, the control means includes means for tuning the vent valves and thereby controlling the venting of the reaction vessels to atmosphere.

Advantageously, by monitoring the air pressure within the vapor recovery system at various points during the adsorbing and regenerating processes, it is possible to provide near pressure equalization in the various portion of the vapor recovery system previously compartmentalized by closed valves before fully opening those closed valves and switching between adsorbing and regenerating the two beds of adsorbent. As a result, sudden pressure fluctuations are prevented and smoother more efficient system operation is achieved.

Further, it should be appreciated that through the elimination of sudden pressure fluctuations, the association sudden stresses and forces that are otherwise placed on the bed of adsorbent are also eliminated. As a result, the structural integrity of the adsorbent is maintained over a longer period of time and the adsorbent effectively provides a longer service life. Additionally, sudden short or peak loads are no longer placed upon the vacuum pump. As a result, wear on pump components is significantly reduced and the vacuum pump therefore furnishes longer operating or service life. Hence, the maintenance requirements are also reduced. Consequently, the vapor recovery apparatus provides increases in both efficiency and productivity to the benefit to the system operator.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing.

Figure 1:
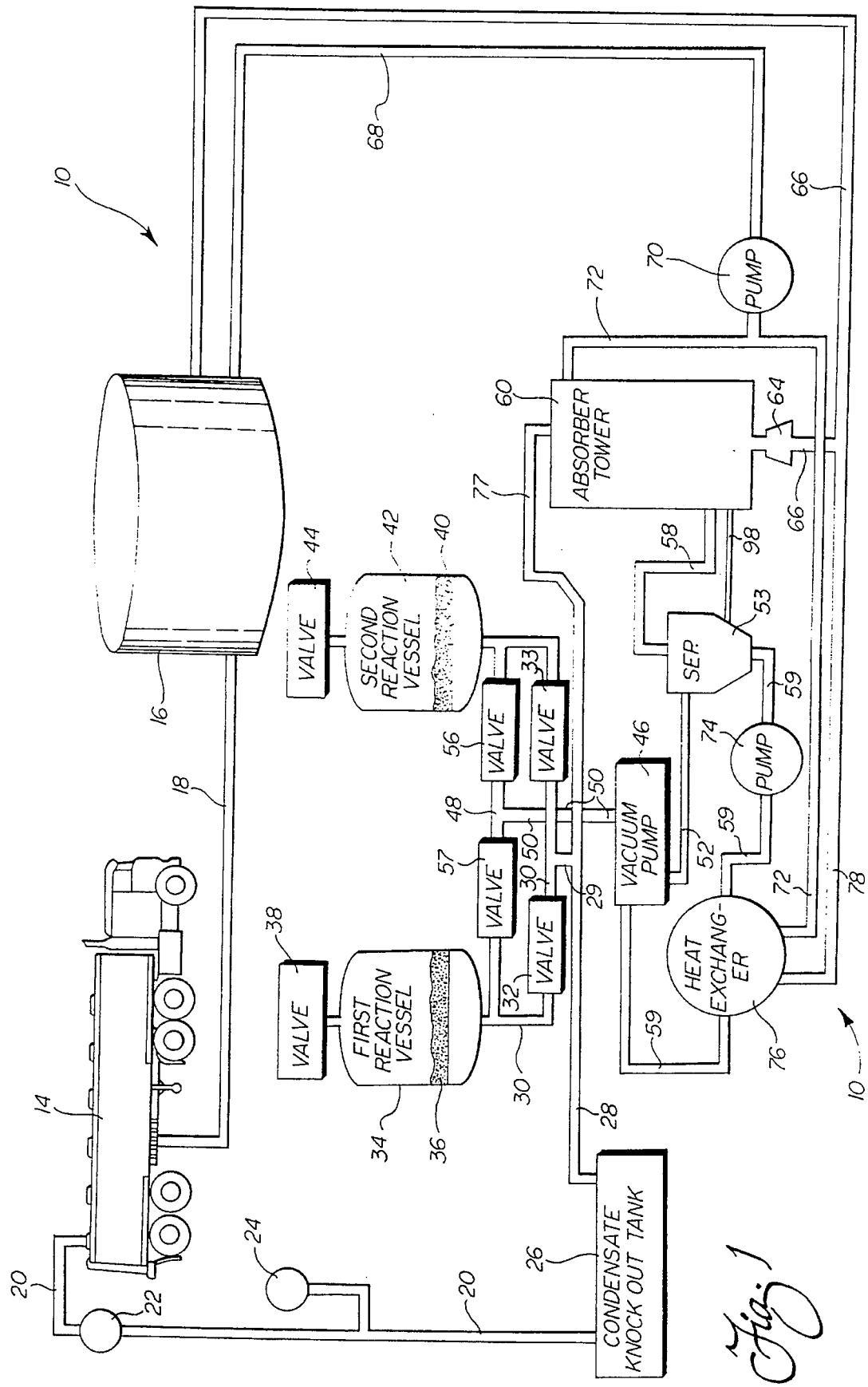
FIG. 1 is a schematical view illustrating a vapor recovery apparatus.

Reference will now be made in detail to the present preferred embodiment of the invention, an example of which is illustrated in the accompanying drawing.

DETAILED DESCRIPTION OF THE INVENTION

Reference is now made to the drawing figures showing an apparatus 10 for volatile liquid vapor recovery incorporating an automatic flow control system 12. As will become apparent as the description hereof proceeds, the flow control system 12 functions to significantly enhance the operating efficiency and productivity of the adsorption/absorption vapor recovery apparatus 10 by substantially eliminating sudden internal pressure swings so as to smooth the operation of the apparatus and extending the time between pump and bed maintenance requirements. The vapor recovery apparatus 10 is generally of the type disclosed and described in co-pending U.S. patent application Ser. No. 08/380,483 to Jordan entitled "Absorber Fluid Circuit For Vapor Recovery System", now U.S. Pat. No. 5,515,086, the disclosure of which is fully incorporated herein by reference.

As shown the vapor recovery system 10 is particularly suited to the recovery of vaporized hydrocarbons of the type expelled from trucks, tank cars and other vessels 14 as they are loaded with hydrocarbons from a storage tank 16 through a feed line 18. More particularly, those vapors are collected as an air-hydrocarbon vapor mixture in a collection line 20, attached to the truck 14 and delivered past a vapor check valve 22 and pressure/vacuum vent 24 to a condensate knock-out tank 26. From there, the air-hydrocarbon vapor mixture passes along the lines 28, 29 and 30 past open valve 32 (valve 33 is closed) to the first reaction vessel 34 including a first bed of adsorbent 36. The bed 36 adsorbs the volatile hydrocarbon vapors and clean air is exhausted past the valve 38 into the environment.

Simultaneously, the adsorbent bed 40 in the second reaction vessel 42 is being regenerated: that is, the capacity of the bed 42 to adsorb vapor is being renewed. To achieve this end, valve 44 is initially closed and the vacuum pump 46 is operated to pull a vacuum on the bed 40 in the second reaction vessel 42. Generally, as is known in the art, a liquid ring, two-stage vacuum pump having a capacity of 100–2000 cfm is utilized for this purpose. Such a pump may, for example, be obtained from Graham Vacuum Pump of Batavia, N.Y. (e.g. Model 2V7240).

As the pump 46 draws the vacuum down in the reaction vessel 42 to 22–28 inches of mercury vacuum, a mixture of air and volatile liquid vapor is pulled from the bed 40. This mixture is directed by the pump 46 through conduits 48, 50, 52 into the sealing fluid separator 53 by operation of the valve 56 (open) and the valve 57 (closed). The sealing fluid separator 53 separates the pump sealing fluid, required for proper operation of the liquid ring, two-stage vacuum pump, from both the condensed hydrocarbons that are recovered and delivered through line 98 to the absorber tower 60 and the air-vapor mixture that is directed through conduit 58 also to the absorber tower 60. As will be described in greater detail below, the sealing fluid recovered from the separator 53 is recirculated through the conduit lines 59 to the pump 46.

Toward the end of the regeneration cycle, (e.g. when a specific vacuum level is reached or for a specific time such as the last one to two minutes of an approximately 10–17 minute cycle), a small quantity of purge air is introduced into the reaction vessel 42 by opening valve 44. This purge air is drawn from the ambient atmosphere through line 62 and is passed through the bed 40 to polish the adsorbent clean of the remaining hydrocarbons. During this process it should be appreciated that the purge air is only introduced into the bed 42 at a rate sufficient to substantially maintain a pressure of approximately 22–28 and more preferably 25–27 inches of mercury vacuum. The purge air and the last of the hydrocarbons is also directed by the pump 46 through the separator 53. As is known in the art, the absorber tower 60 provides a countercurrent flow of solvents such as lean oil by means of a dispersal sprayer (not shown). The lean oil serves to condense the hydrocarbon vapors from the air-hydrocarbon vapor mixture drawn from the reaction vessel 42 by the pump 46 as just described. The condensed hydrocarbons and lean oil are preferably collected from the bottom of the absorber tower 60 by operation of a venturi tube 64 and then delivered via conduit 66 to the storage tank 16. Preferably, the venturi tube 64 is able to pump between 25–200 gallons per minute. The sizing of the venturi tube depends upon the head pressure in the gasoline storage tank 16 and the desired pump or flow rate. The venturi tube 64 may be of a size from 1–12 inches and may, for example, be obtained from Penberthy of Prophetstown, Ill. By using a venturi tube 64 instead of a centrifugal pump of a type used in the prior art, it is possible to eliminate this mechanical device from the apparatus 10 thereby reducing original equipment, maintenance and operating costs. It should be appreciated, however, that the well known centrifugal pump may still be used in place of the venturi tube 64 if desired.

The residue air that exits from the absorber tower 60 is largely free of volatile liquid vapor. It, however, is preferably recirculated or recycled for introduction into the first reaction vessel 34 via the conduits 77 and 30. In this way, any residual volatile liquid vapor may be captured in the bed 36 to complete the cleaning of the air prior to exhausting into the environment past valve 38.

Of course, as is well known in the art it should be appreciated that the reaction vessels 34 and 42 are essentially identical and that the operation thereof may be reversed as required to provide for continuous processing. This means that when the bed 36 is saturated, the bed 36 may be regenerated in the manner described above with reference to the bed 42 while the bed 42 is simultaneously utilized to capture hydrocarbons in the manner described above with reference to the bed 36. This is accomplished by simply reversing the operation of the valve pairs 32 and 33, 56 and 57 and 38 and 44, respectively to control the flow through the vapor recovery apparatus 10.

As should be further appreciated from viewing FIG. 1, lean oil is withdrawn from the storage tank 16 through a first conduit 68 connected to the inlet of the supply pump 70. Supply pump 70 provides a pumping capacity of preferably between 50–400 gallons a minute and, therefore, may vary from 2–15 horsepower. The outlet of the supply pump 70 is connected to a second conduit 72 that directs the lean oil to both the absorber tower 60 and a heat exchanger 76 for cooling the seal liquid of the vacuum pump 46. The lean oil flow is split approximately 50/50 between the heat exchanger 76 and the absorber tower 60. If desired, however, a flow control valve may, of course, be provided to adjust the flow to any desired ratio required for most efficient processing. Preferably, the absorber tower 60 is a packed absorber tower such as available from Jordan Technologies Inc. under the model designation B-1. The heat exchanger is preferably a tubing shell as manufactured, for example, by BASCO of Buffalo, N.Y.

As described above, during processing, seal liquid is recovered from the air-hydrocarbon vapor mixture and condensates in the separator 53 and then circulated by pump 74 at a rate of 5–100 gallons a minute through conduit lines 59 and the heat exchanger 76 back to the vacuum pump 46. In the heat exchanger 76, heat is transferred from the seal liquid to the lean oil which is then returned through conduit lines 78, 66 back to the storage tank 16. As a result, the vacuum pump 46 operates at a cooler temperature and, therefore, a greater efficiency. Accordingly, bed regeneration is completed in a shorter period of time. Operating costs are therefore reduced while system efficiency and throughput are increased.

During processing, the absorber tower 60 also receives a continuous flow of "cool" lean oil to maximize the absorption efficiency in the absorber tower and thereby enhance the generation and recovery of hydrocarbon vapor condensate. As a result, cleaner air is discharged to the second bed through conduits 77 and 30. Accordingly, system efficiency is again improved.

The improved efficiencies of the vapor recovery apparatus 10 are maintained over time and from cycle-to-cycle by the flow control system 12. As best shown with reference to FIG. 2, the flow control system 12 includes a controller 80 which may take the form of a programmable logic controller, such as a General Electric IC693CPU331 processor with an IC693MDL931 digital output and an IC693AL6221 analog input, operated by means of appropriate software or a dedicated microprocessor. The controller 80 is operatively connected by means of a power feed line 81 to an electrical power source P and by means of control lines 82 to the vent valves 38, 44, the input valves 32, 33 and the regeneration valves 56, 57. Each of the valves 32, 33, 38, 44, 56, 57 is motor driven and infinitely adjustable between a fully open and fully closed position. Valves of this type are available, for example, from Texsteam, Inc. of Morton Grove, Ill. as model numbers MAR-250-30-120V-N7 and MAR-100-16-120V-N7.

As further shown, the controller 80 is also operatively connected to a pressure sensor means in the form of a vacuum transmitter 84 by means of signal line 86. The vacuum transmitter 84 may, for example, be a product number 1151APS5221B1 M4 vacuum transmitter as available from Rosemount, Inc. of Chanhassen, Mn.

The vacuum transmitter 84 is operatively connected to a pressure monitor line 88. The pressure monitor line 88 may be selectively placed in communication with the main conduit line 30 leading to the first reaction vessel 34 by operation of the solenoid valve 90, with the main conduit line 30 leading to the second reaction vessel 42 by operation of the solenoid valve 92 and the main conduit line 50 leading to the vacuum pump 46 by operation of the solenoid valve 94. Thus, it should be appreciated that it is possible to selectively monitor the pressure in the main conduit line 30 adjacent the first reaction vessel 34, the pressure in the main conduit line 30 adjacent the second reaction vessel 42, and the pressure in the main conduit line 50 adjacent to vacuum pump 46. The solenoid valves 90, 92, 94 may, for example, be number EF8262690V valves as available from ASCO of Florham, N.J.

Figure 2:
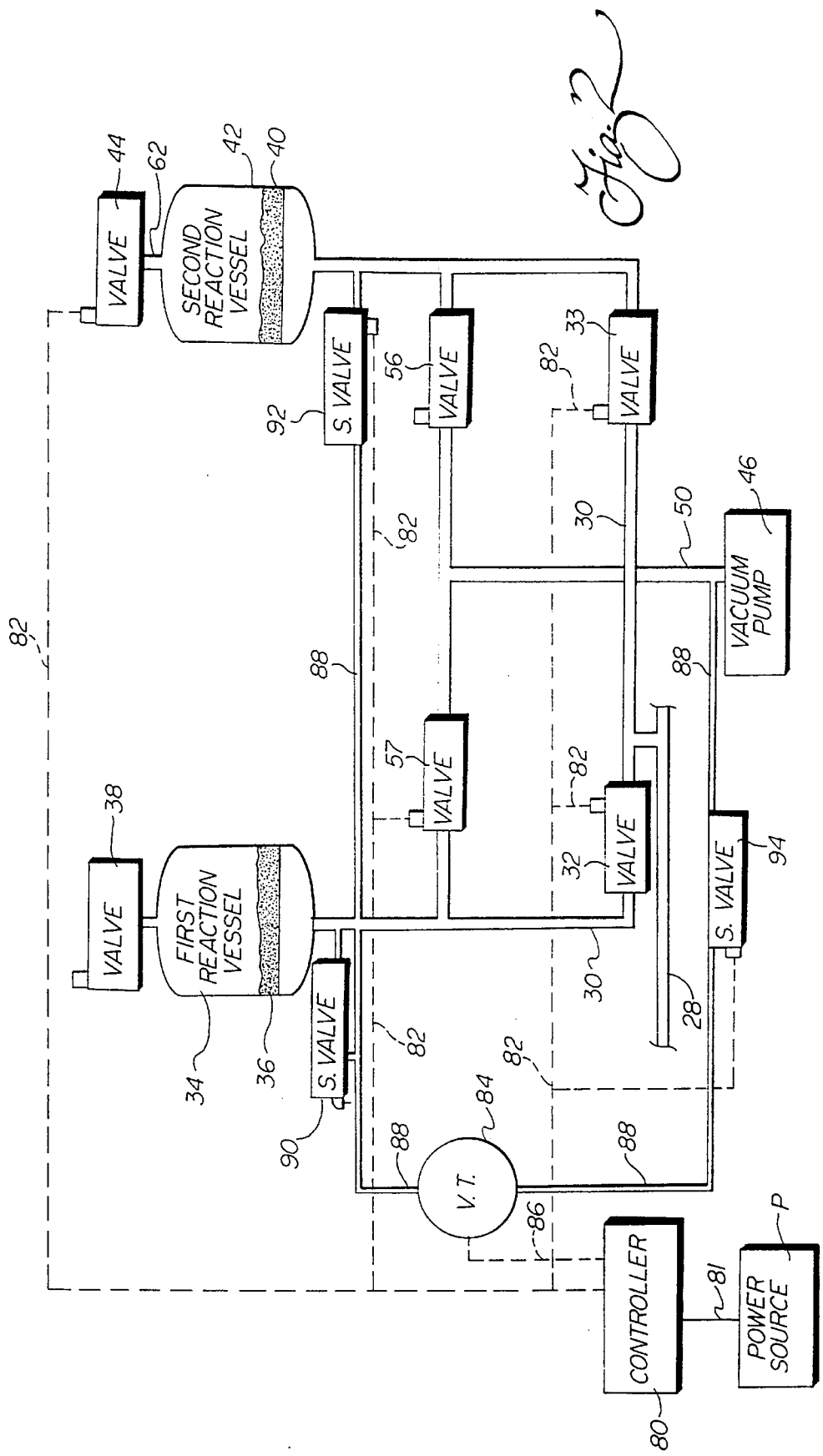
FIG. 2 is another schematical view showing in detail the automatic valve control system utilized on the apparatus shown in FIG. 1.

The operation of the flow control system shown in FIG. 2 will now be described in detail. At the beginning of the regeneration cycle for either of the beds 36, 40 in the first and second reaction vessels 34, 42, the vacuum level of the apparatus 10 is monitored adjacent the vacuum pump inlet: that is by providing fluid communication between the vacuum transmitter 84 through the monitor line 88 to the main conduit line 50. This is achieved by opening the solenoid valve 94 while simultaneously maintaining the solenoid valves 90 and 92 closed. If the bed 36 in the first reaction vessel 34 is being regenerated, the controller 80 cracks the regeneration valve 57 by providing a relatively short signal along the control line 82 to cause the motor of the valve 57 to drive that valve partially open (valve 56 is closed and vacuum pump 46 is already operating). With the regeneration valve 57 cracked open, the level of vacuum being monitored in the main conduit line 50 gradually changes from approximately 25–27.5 inches of mercury vacuum to approximately 10–20 inches of mercury vacuum. Upon reaching this level, the controller sends a signal along the control line 82 to close the solenoid valve 94 and open the solenoid valve 90. As a result, the monitor line 88 is placed in communication with the main conduit line 30 adjacent the first reaction vessel 34. Once the vacuum level being monitored at this point reaches a level of approximately 10–12 inches of mercury vacuum, the controller 80 sends a control signal along the line 82 to the motor controlling the regeneration valve 57 causing that valve to fully open. Advantageously, this initial cracking and then fully opening of the regeneration valve 57 (in response to vacuum levels being monitored adjacent to vacuum pump 46 and the reaction vessel 34) insures that the vapor recovery apparatus 10 and, more particularly, the bed of adsorbent 36 and vacuum pump 46 are subjected to a smooth, gradual, pressure change. This provides the apparatus 10 with the most smooth and efficient operation possible while also minimizing sudden load fluctuations on the vacuum pump that might otherwise cause undue wear and strain as well as sudden pressure changes in the bed 36 that might otherwise crumble or damage some of the adsorbent thereby adversely effecting its adsorbtivity.

Toward the end of the regeneration cycle, vent valve 38 is cracked slightly to allow purge air to be introduced into the reaction vessel 34. This purge air passes through the bed of adsorbent and polishes the adsorbent clean of the remaining hydrocarbons. As noted above, however, the purge air is only introduced into the bed 36 at a rate sufficient to substantially maintain a pressure of approximately 22–28 and more preferably 25–27 inches of mercury vacuum. To achieve this end, the controller 80 sends a control signal along the control line 82 so that the motor of valve 38 drives the valve open the desired amount to allow the entry of the purge air while maintaining the desired level of vacuum for a desired period of time; a level that is monitored by the vacuum transmitter 84 through the monitor line 88 and solenoid valve 90 at the main conduit line 30.

Upon completion of bed regeneration, controller 80 sends a control signal along control line 82 causing the motor of valve 57 to drive regeneration valve 57 fully closed. At this time the vacuum transmitter 84 continues to monitor the vacuum pressure in the main conduit line 30 adjacent to the first reaction vessel 34. With the vent valve 38 cracked open, the pressure in the first reaction vessel 34 and, therefore, the main conduit line 30 adjacent thereto gradually draws from a peak level of approximately 22–28 inches of mercury vacuum to a level of approximately 2 inches of mercury vacuum. At that time, a control signal is sent along control line 82 causing the motor of valve 38 to drive the valve 38 fully open. Substantially simultaneously, control signals are sent along the control line 82 causing the motor of the input valve 33 to drive the valve 33 closed and the motor of the input valve 32 to gradually drive the valve 32 open. As a result, the air-hydrocarbon vapor mixture passes through the main conduit lines 28, 29 and 30 into the first reaction vessel 34 where the hydrocarbon vapors are absorbed in bed 36 and substantially hydrocarbon free air passes into the environment through the fully open vent valve 38.

At the same time, the controller 80 sends control signals along the control line 82 causing the solenoid valve 90 to close and the solenoid valve 94 to open. In this way, the vacuum pressure in the main conduit line 50 is again being monitored by the vacuum transmitter 84. Additionally, a control signal is sent along control line 82 causing the motor of regeneration valve 56 to crack valve 56 open. The regeneration of the bed 40 in the second reaction vessel 42 is then completed just as described above with respect to the regeneration of the bed 36 in the first reaction vessel 34 except that the operation described for valves 38, 57, 32 and 90 now applies respectively to valves 44, 56, 33 and 92. Hence, it should be appreciated that the vapor recovery apparatus functions in a cyclical manner with the two reaction vessels 34, 42 alternating back and forth between adsorption and regeneration modes of operation. Throughout this alternation, the controller 80 of the flow control system insures that all pressure swings are gradually incurred so that smooth, reliable operation results.

In summary, numerous benefits result from employing the concepts of the present invention. A vapor recovery apparatus 10 equipped with the flow control system of the present invention utilizes a vacuum transmitter 84 to monitor the vacuum pressure in the apparatus as required adjacent to the first reaction vessel 34, the second reaction vessel 42 and the vacuum pump 46. As a result of this monitoring, the controller 80 functions to gradually open and close the valves 32, 33, 38, 44, 56, 57 so that the components of the apparatus are only subjected to gradual pressure changes. Peak loads in the vacuum pump 46 are significantly reduced and its reliable operation is, therefore, extended over a longer service life. Similarly, sudden pressure changes that could lead to sudden shifts in the bed of adsorbent that might crumble or otherwise damage the adsorbent are avoided. As a result, the structural integrity of the adsorbent is maintained so that full adsorption capacity remains available.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. An apparatus for recovering volatile liquid vapor from an air-volatile liquid vapor mixture, comprising:

first and second reaction vessels each including a bed of adsorbent for adsorbing volatile liquid vapor and producing relatively volatile liquid vapor-free air;

a vacuum pump for regenerating said absorbent bed in each of said first and second reaction vessels and releasing previously adsorbed volatile liquid vapor;

means for recovering volatile liquid vapor generated during bed regeneration;

means for circulating the air-volatile liquid vapor mixture through said apparatus between said first and second reaction vessels, vacuum pump and recovering means, said circulating means including main conduit means for the passage of the air-volatile liquid vapor mixture and valve means for directing the flow of the air-volatile liquid vapor mixture along said main conduit means; and flow control means including an air pressure monitor for monitoring air pressure in said apparatus adjacent each bed of adsorbent and an inlet of said vacuum pump and control means responsive to said air pressure monitor for controlling operation of said valve means.

2. The apparatus set forth in claim 1, wherein said air pressure monitor is a vacuum transmitter including a monitoring line and a series of sensor valves for selectively communicating said monitoring line with said main conduit means adjacent each of said bed of adsorbent and said inlet of said vacuum pump.

3. The apparatus set forth in claim 2, wherein said control means further includes means for tuning said valve means for directing the flow of air volatile liquid vapor mixture between said first and second reaction vessels and said vacuum pump in response to said control means.

4. The apparatus set forth in claim 3, wherein said apparatus further includes vent valves, one vent valve being connected to each reaction vessel, said control means also including means for tuning said vent valves for controlling the venting of said first and second reaction vessels to atmosphere.

5. A flow control system for use on a vapor recovery system including first and second adsorbent beds, a vacuum pump for regenerating said adsorbent beds, conduits for air-volatile vapor mixture flow and valves for directing flow through the conduits, said flow control system, comprising:

means for monitoring air pressure adjacent each of said first and second adsorbent beds and an inlet of said vacuum pump; and means for controlling operation of the valves of the vapor recovery system in response to said monitoring means.

6. The apparatus set forth in claim 5, further including a monitoring line and a series of sensor valves for establishing fluid communication between said monitoring line and conduits of the vapor recovery system providing for air-volatile vapor mixture flow.

* * * * *